United States Patent
Fonseca

(10) Patent No.: US 9,509,347 B2
(45) Date of Patent: Nov. 29, 2016

(54) ANTENNA DRIVER WITH SCALABLE OUTPUT IMPEDANCE

(71) Applicant: Broadcom Corporation, Irvine, CA (US)

(72) Inventor: Humberto Fonseca, Cirencester (GB)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 14/101,751

(22) Filed: Dec. 10, 2013

(65) Prior Publication Data

US 2015/0124858 A1 May 7, 2015

Related U.S. Application Data

(60) Provisional application No. 61/900,043, filed on Nov. 5, 2013.

(51) Int. Cl.
*H04B 1/38* (2015.01)
*H04B 1/04* (2006.01)

(52) U.S. Cl.
CPC .................................. *H04B 1/0458* (2013.01)

(58) Field of Classification Search
CPC .......... H04B 1/40; H04B 1/403; H04B 3/23; H04B 5/0037; H04B 5/0031; H04B 1/0458; H04L 27/2601
See application file for complete search history.

(56) References Cited

U.S. PATENT DOCUMENTS

| | | | |
|---|---|---|---|
| 2002/0041250 A1* | 4/2002 | Esposito et al. | 342/45 |
| 2002/0153952 A1* | 10/2002 | Louis | H03F 1/3229 330/151 |
| 2005/0134396 A1* | 6/2005 | Pehlke et al. | 332/103 |
| 2006/0291589 A1* | 12/2006 | Eliezer et al. | 375/302 |
| 2008/0129610 A1* | 6/2008 | Tsfati | H03D 3/007 343/702 |
| 2011/0086600 A1* | 4/2011 | Muhammad | H04B 1/0458 455/120 |
| 2011/0304439 A1* | 12/2011 | Panchalan | G06K 7/10297 340/10.3 |
| 2013/0130621 A1* | 5/2013 | Kim et al. | 455/39 |
| 2013/0342404 A1* | 12/2013 | Anderson | 343/703 |
| 2014/0073241 A1* | 3/2014 | Luong | H04B 5/00 455/41.1 |

* cited by examiner

*Primary Examiner* — Syed Haider
(74) *Attorney, Agent, or Firm* — Brinks Gilson & Lione

(57) ABSTRACT

A system includes an antenna, a modulator, and a controller. The modulator may be operatively connected to the antenna. The modulator may be configured to send, a signal to a wireless device via the antenna. The modulator may have an output impedance. The controller may be connected to the output of the antenna. The controller may include a detector and a driver. The detector may be configured to determine the amplitude of a response from the wireless device. The driver may be configured to scale the output impedance responsive to the amplitude.

20 Claims, 8 Drawing Sheets

ANTENNA DRIVER WITH SCALABLE OUTPUT IMPEDANCE

PRIORITY CLAIM

This application claims priority to U.S. Provisional Application Ser. No. 61/900,043, filed Nov. 5, 2013, which is incorporated herein by reference in its entirety.

TECHNICAL FIELD

This disclosure relates to load modulated antennas. The disclosure also relates to scalable output impedances for antenna drivers.

BACKGROUND

Radio Frequency Identification (RFID) systems, such as contactless and/or near field communications (NFC), are used in a wide variety of industries. For example, RFID systems may be implemented in inventory management systems, building access systems, personnel identification, toll collection, financial transactions, and/or other applications. A passive or active tag device may communicate with a reader device. In some cases, two-way communication may be possible.

DETAILED DESCRIPTION

The disclosure below concerns techniques and architectures for scaling the output impedance of an antenna driver for load modulated antennas. In some cases, modulating the load of a first antenna may modulate the load of a second antenna coupled to the first. In some cases, the antennas may be coupled via a carrier signal transmitted by one or more of the antennas. The second antenna may then monitor its own impedance load to detect the modulation from the first antenna to receive transmitted data from the first antenna. In some cases, the impedance load imparted on the second antenna may vary with the distance separating the first and second antennas, e.g. the coupling efficiency between the antennas may change. The signal-to-noise ratio (SNR) of data being sent to the second antenna via load modulation of the first antenna may be affected by the distance between the antennas. To control the SNR of the data transmitted between the antennas, logic coupled to one or more of the antennas may scale or otherwise adjust the output impedance of one or more the antennas. For example, the output impedance of the second antenna may be scaled by logic coupled to the antenna in response to changes in the distance between the antennas or the second antenna's detected impedance load.

Figure 1:
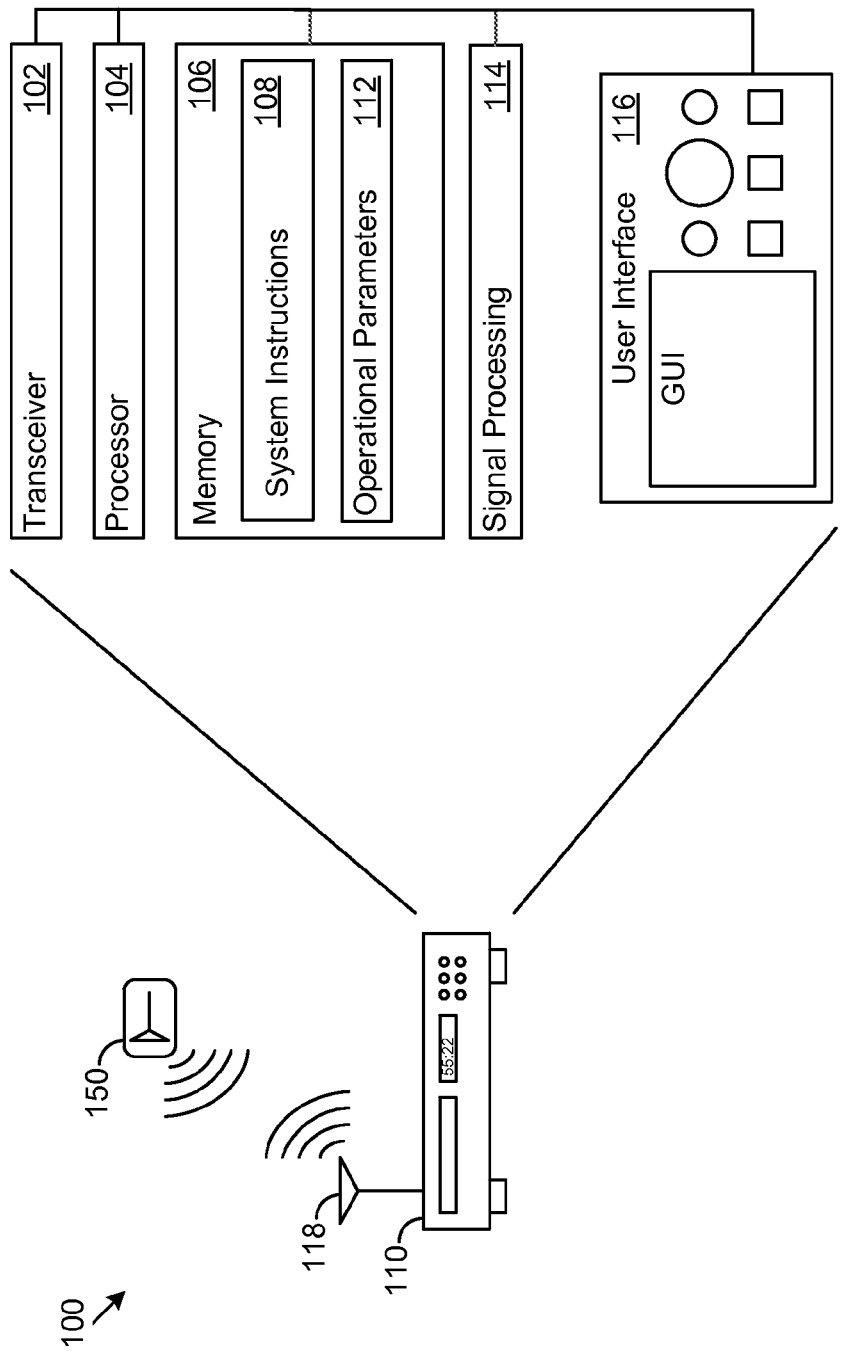
FIG. 1 shows an example signaling environment.

The example signaling environment described below provides an example context for explaining the techniques and architectures to support scaling the output impedance of an antenna. FIG. 1 shows an example signaling environment 100. In one example, the reader 110 may communicate with a tag 150. The reader 110 may be a communication device, such as a point of sale (POS) station, keycard reader, or cellular telephone. However, the reader 110 may be virtually any device implementing load-modulated signal reception and/or transmission. For example, a portable gaming system, satellite navigation system, or tablet computer may use such signaling methods. The tag 150 may be a keycard, label, and/or other device. In some implementations, the tag may be coupled to a communication device, such as a cellular telephone, tablet, and/or other communication device. In various implementations, the tag 150 may be controlled by the coupled communication device.

The reader 110 may include transceiver elements 102 to support RF communication, and one or more processors 104 to support execution of applications and operating systems, and to govern operation of the reader 110. The reader 110 may include memory 106 for execution support and storage of system instructions 108 and operational parameters 112. The reader 110 may include a user interface 116 to allow for user operation of the reader 110. Signal processing hardware 114 (e.g., an Analog to Digital Converter (ADC), baseband processors or other signal processing circuits.) may also be included to support transmission and reception of signals. The signal processing hardware 114 may further include logic, such as an antenna driver executing a control loop, to adjust the output impedance of a coupled antenna 118. For example, for example the signal processing hardware may include an ADC and/or a locking circuit to target a determined SNR by adjusting the impedance load of antenna 118.

Figure 2:
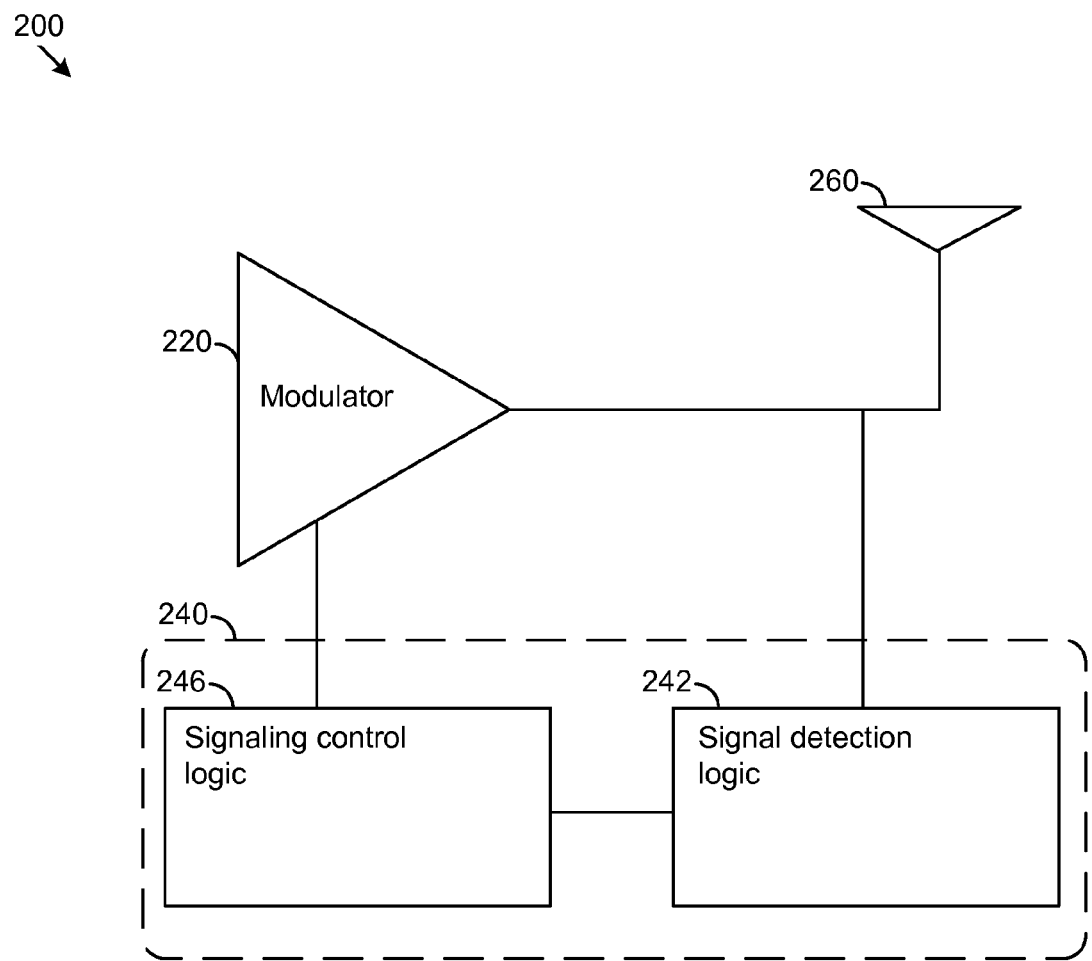
FIG. 2 shows an example antenna driver.

FIG. 2 shows an example antenna driver 200. The antenna driver 200 may include a modulator 220 and a controller 240 coupled to antenna 260. The modulator 220 may generate a signal, e.g. a differential phase modulated signal, amplitude modulated signal, or other modulated signal, which is output coupled to the antenna. Incoming signals from the antenna may be passed to the controller 240, which may include logic for signal detection 242 and logic for signaling control 246 of the modulator 220. For example, the signaling control logic 246 may apply automatic gain control (AGC) to maintain average carrier output amplitude at a given level. In some implementations, the signaling control logic may execute a switching operation, e.g. engage and/or disengage finger elements within the modulator, to scale the output impedance of the modulator 220. The signaling control logic 246 may scale the output in response to changes in the antenna impedance. For example the signaling control logic 246 may monitor a carrier component amplitude in a received signal from the antenna 260. The signaling control logic 246 may scale the output impedance of the modulator 220 in response to changes in the carrier component amplitude. In some cases, the carrier component amplitude and/or the ratio of the carrier component amplitude to the noise level may be dependent on the ratio of the impedance load of the antenna 260 to the output impedance of the modulator 220.

Additionally or alternatively, the controller 240 may include input processing. In various implementations input processing may include a resistive element at an input of the controller 240, carrier cancellation systems, and/or other input processing.

Figure 3:
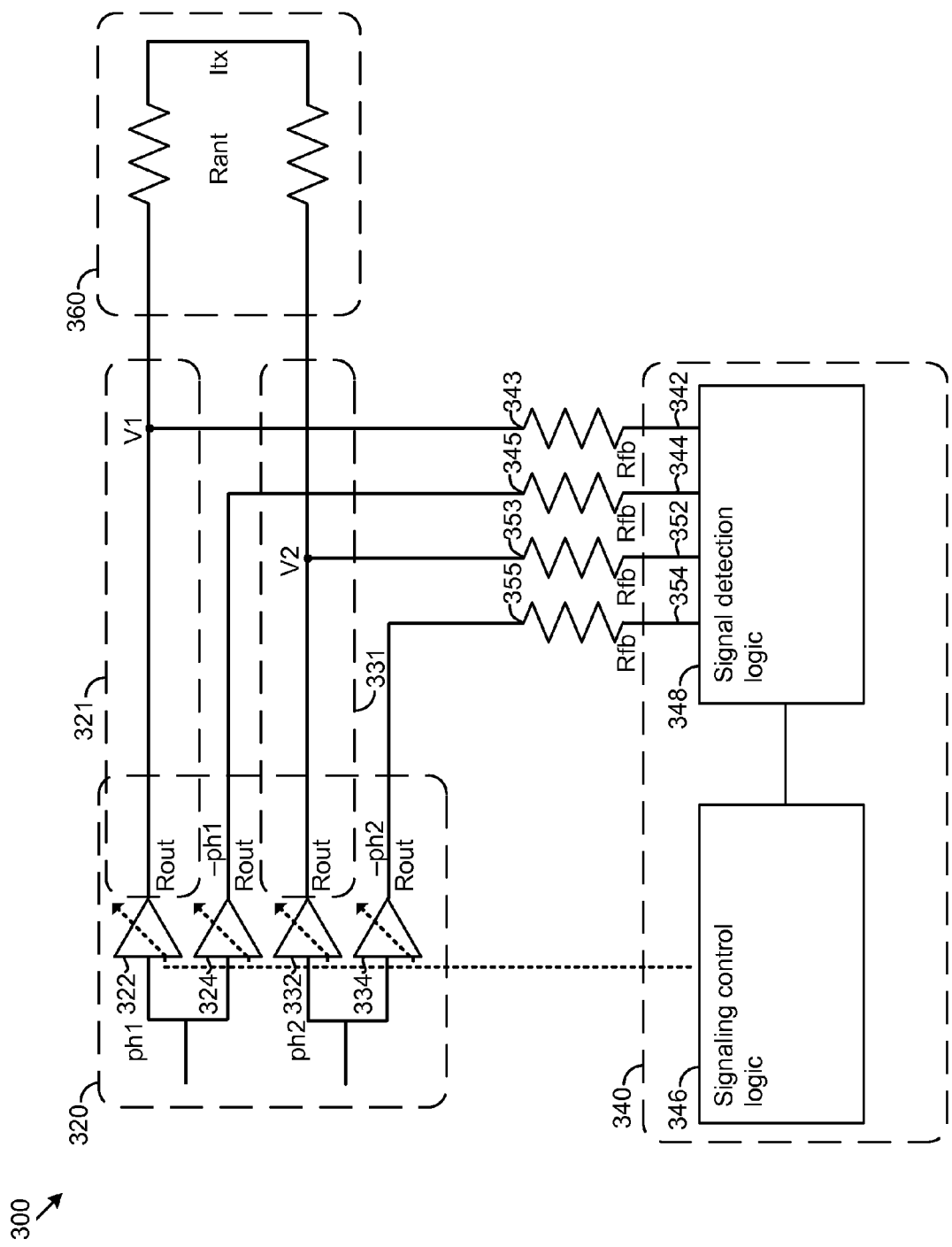
FIG. 3 shows an example antenna driver.

FIG. 3 shows an example antenna driver 300. The example antenna driver includes a modulator 320 and a controller 340 and is coupled to an antenna 360. The antenna 360 may facilitate communications with a remote wireless device that may send return communication via load modulation. For example, the wireless device may modulate the load of its own antenna to cause detectable changes in the load of the antenna 360.

The modulator 320 may include multiple signal paths 321, 331. The signal paths may include amplifier elements 322, 324, 332, 334. Signals ph1 on path 321 and ph2 on path 331 may be phase modulated with respect to one another and transmitted by the antenna 360. For example, ph1 and ph2 may be phase inverted with respect to each other to signal a logical high and aligned in phase to signal a logical low. Other encoding schemes may be implemented, for example a relational change between the phase of ph1 and ph2 may signify a change from a high to a low. Amplifier elements 324 and 334 may supply phase inverted versions of ph1 and ph2, referred to as -ph1 and -ph2, respectively. The phase inverted signals -ph1 and -ph2 may be provided to the carrier cancellation inputs 344, 354 of the controller 340. The amplifier elements 322, 324, 332, 334 may be constructed from parallel finger transistor elements. For example, fingers of unitary transconductance. The parallel transistor elements may be switched, individually or as a group, to scale the output impedance (Rout) of the modulator 320. In some implementations, the controller 340 may scale the output impedance of the modulator over a range:

$$[Ru, \frac{Ru}{N}] \qquad \text{Equation 1}$$

Where Ru is the unitary resistance of a finger transistor element and N is the total number of parallel finger elements. The output impedance (Rout) for a system with Ne finger transistor elements engaged may be expressed as:

$$Rout = \frac{Ru}{Ne} \qquad \text{Equation 2}$$

In various implementations, finger elements of different types may be placed in parallel. For example, finger elements may not have unitary resistances/transconductances. The modulator 320 may have varying steps sizes throughout its output impedance range.

The antenna 360 transmits signals -ph1 and -ph2 and receives incoming signal current Itx. Itx may be an induced current on the antenna 360. The mixed transmitted/received signal V1 on path 321 may be expressed as:

$$V1 = ph1 + Rout \times Itx \qquad \text{Equation 3}$$

The transmitted/received signal V2 on path 331 may be expressed as:

$$V2 = ph2 - Rout \times Itx \qquad \text{Equation 4}$$

In some implementations, Itx may be encoded on a carrier provided by the antenna driver 300, which may be disposed on a reader. For example, a wireless device, e.g. a tag, may encode a data message on a backscattered carrier from the reader's transmission. In some cases, Itx may include a carrier component. Additionally or alternatively, Itx may be modulated on a subcarrier generated by the tag or the reader. For example the subcarrier may be detuned from the carrier by 847 kHz.

The signals V1 and V2 may be passed to the controller 340. The input to the controller may include multiple ports 342, 344, 352, 354. Ports 342 and 352 may accept V1 and V2, respectively. Ports 344 and 354 may accept -ph1 and -ph2, respectively. -ph1 and -ph2 may be used to cancel the ph1 and ph2 components of V1 and V2, respectively. The ports 342, 344, 352, 354 may include resistive elements 343, 345, 353, 355. For example resistive elements 343, 345, 353, 355 may have resistance Rfb where Rfb>>Rout. In some case, the voltage drop across Rfb may be large, and a voltage supply to Rfb may be considered to produce a current past Rfb and low or zero voltage.

The input to the controller 340 may include filters and other protection circuits 350 to prevent damage to the signal detection logic 348 and the signal control logic 346 included in the controller. The signal detection logic may include components for signal detection a decoding, e.g. current detectors, ADCs, modems, and/or other processing components. The signal detection logic 348 may cancel the ph1 and ph2 components of the input to the controller and yield a received signal of:

$$Iin = \frac{Rout \times Itx}{Rfb} \qquad \text{Equation 5}$$

For a supply voltage VDD supplied to the signal detection logic 348 Equation 5 may be expressed as:

$$Iin = \frac{Rout \times VDD}{Rfb(Rout + Rant)} \qquad \text{Equation 6}$$

Where Rant is the impedance of the antenna 360, which varies inversely with Itx.

The signal detection logic 348 may filter Iin such that time varying signals at the modulation frequency of the system are decoded, e.g. by a modem, and slower time varying signals are sent to the signaling control logic 346. For example, Iin may be split and portion of the signal sent to the signaling control logic 346 may be low-pass filtered and/or bandpass filtered.

In various implementations, the signaling control logic 346 may include components to control modulator signal level and output impedance, e.g. automatic gain controls (AGCs), switching logic, and/or other control components. As discussed above Itx may include a carrier component. Rant may include a carrier component. The signaling control logic 346 may monitor the level of this carrier component to determine non-data modulation related changes to the signal level. For example, changes related to reader-tag distance (RTD), supply voltage fluctuations, temperature changes, antenna range, hardware component cycling speeds, and/or other signal effects. The signal control logic 346 may counter these effects by altering Rout according to changes in the carrier level, e.g. changes on time scales other than the data modulation time scale. Changing Rout in accord with the carrier level may hold the ratio of Rout to Rant constant within a determined tolerance. Maintaining this ratio may also maintain the carrier-to-noise ratio (CNR) for the received signal.

In various implementations, the example antenna driver 300 and antenna 360 may be implemented in a near field communications (NFC) reader. For example, the antenna driver 300 may operate at 13.56 MHz, have a target output power of 500 mW, use square-wave carrier modulation, have a voltage supply power of 3.3V, have a power efficiency greater than 70%, and be implemented in an integrated circuit of area 0.06 mm². Other configurations may be implemented.

Figure 4:
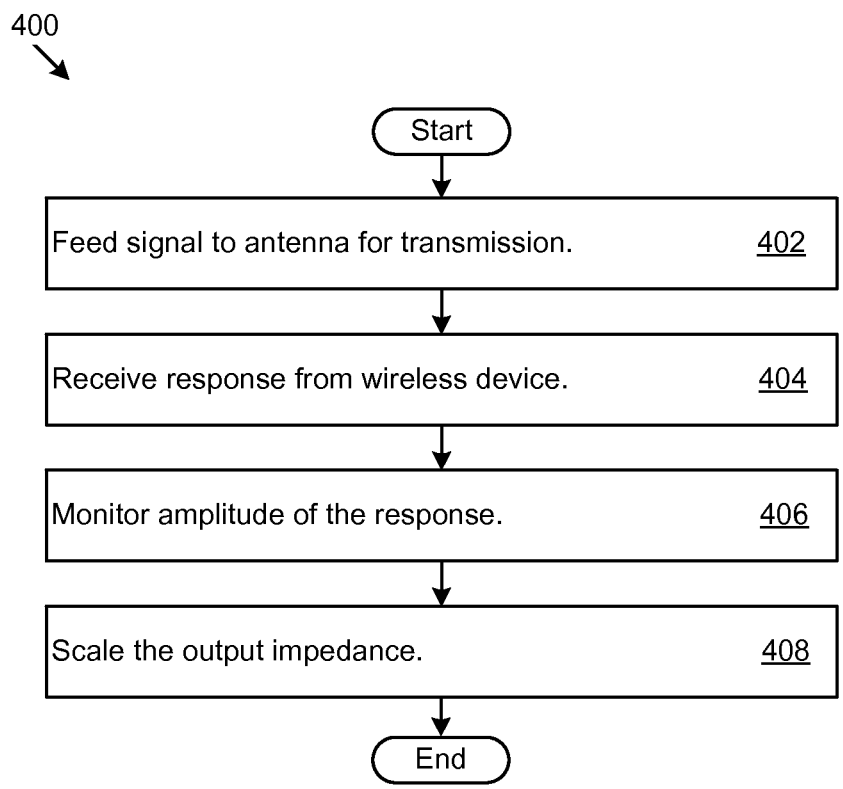
FIG. 4 shows example logic for output impedance scaling.

FIG. 4 shows example logic 400 for output impedance scaling. The example logic 400 may be implemented in the controller, e.g. 240, 340, or an antenna driver. The logic 400 may be implemented as a self-contained control loop. One or more external control package pins may be forgone. For example, two package pins may be used, e.g. transmission/reception. In some implementations the logic may be fully or partially implemented externally to the antenna driver and provide, e.g. via external package pins, control signals to effect switching and/or other actions. For example four package pins may be implemented, e.g. transmission/reception and impedance scaling up/down.

The antenna driver may feed a signal to the antenna for transmission (402). The signal may include a carrier signal. In some cases, the antenna driver may provide a carrier signal when sending data and when not sending data. In various implementations, a wireless device receiving the signal, e.g. a tag, may respond by modulating the carrier or subcarrier provided by the antenna driver. In some implementations, the wireless device may response via a locally generated carrier or subcarrier. The logic 400 may receive the response from the wireless device (404). The logic 400 may monitor, e.g. via current sensors, and/or other detectors, an amplitude of the response (406). The response amplitude may be dependent on an impedance load of the antenna, e.g. antennas 260, 360. The impedance load may vary with a load of a second antenna on the wireless device, which allows the wireless device to send signals via load modulation. The amplitude may also depend on the RTD and/or other factors. These other factors may lead to signal changes on time scales that do not coincide with the time scale of modulation. The amplitude may also depend on the output impedance of the antenna driver. The logic may scale the output impedance to maintain the amplitude of the response (408). In some implementations, the amplitude of the carrier of the response may be maintained. In some cases, the ratio of the impedance load of the antenna to the output impedance of the antenna driver.

Figure 5:
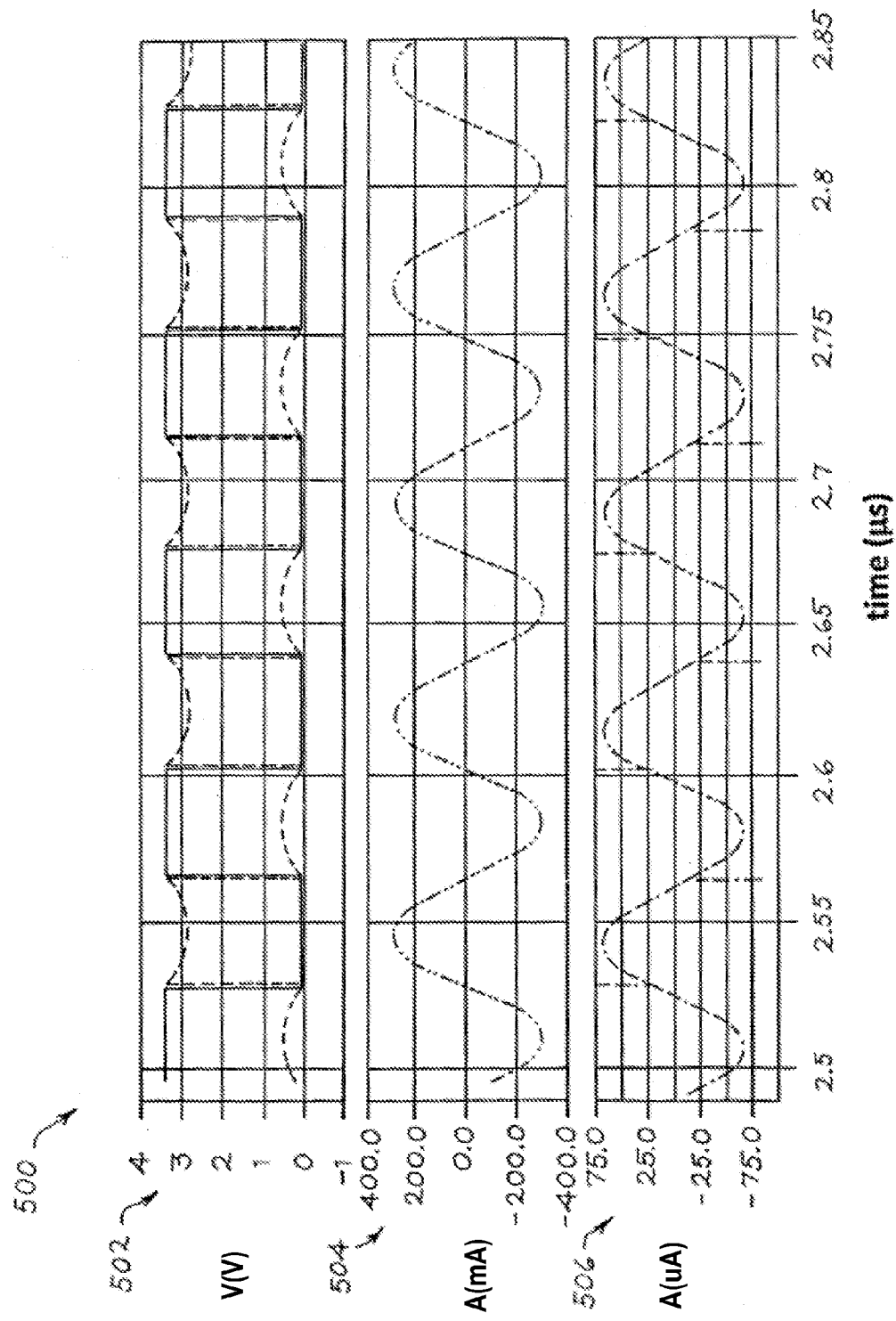
FIG. 5 shows an example carrier cancellation and signal reconstruction.

FIG. 5 shows an example carrier cancellation and signal reconstruction 500. The received waveform 502 includes a square wave carrier and the target sinusoidal output data 504. The reconstruction 506 is faithful to the target sinusoidal output 504. The reconstruction 506 has a smaller dynamic range than the received waveform 502. In some cases, it may be advantageous to perform signal processing, e.g. analog-to-digital conversion, demodulation, and/or other signal processing, on signals with smaller dynamic ranges.

Figure 6:
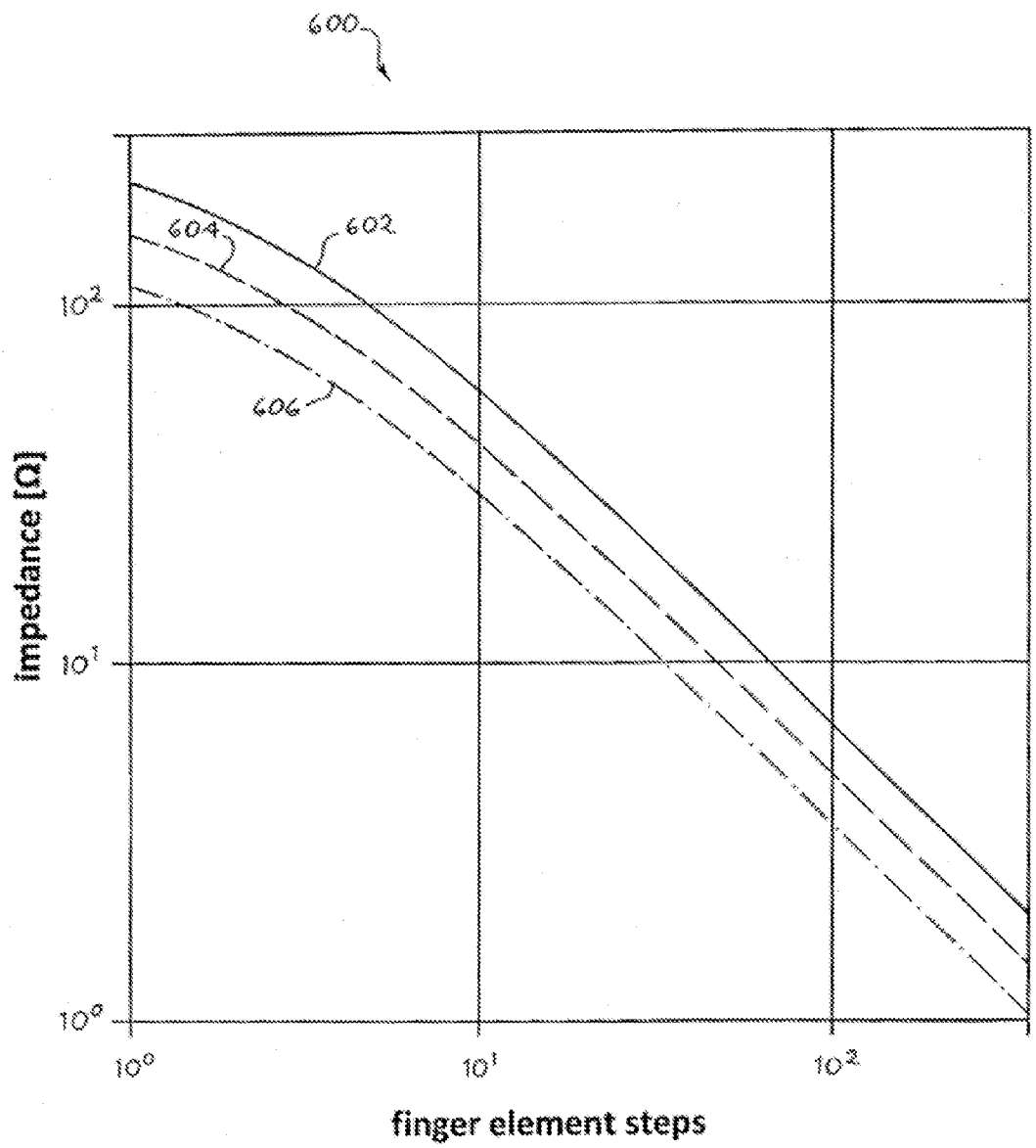
FIG. 6 shows example output impedance scaling.

FIG. 6 shows example output impedance (Rout) scaling 600. In the example antenna drivers, the modulator may include 351 finger steps. For the example fast cycling systems 602, the impedance may be varied from ~200Ω to ~2Ω. For systems with moderate cycling speeds 604, the impedance may be varied from ~140Ω to ~1.5Ω. For the example slow cycling systems 606, the impedance may be varied from ~115Ω to ~1Ω. In the fast 602, moderate 604, and slow 606 example systems a range of about two orders of magnitude may be achieved. A swing in the antenna load of about two orders of magnitude may be compensated by the systems 602, 604, 606. Other ohmic ranges may be implemented.

Figure 7:
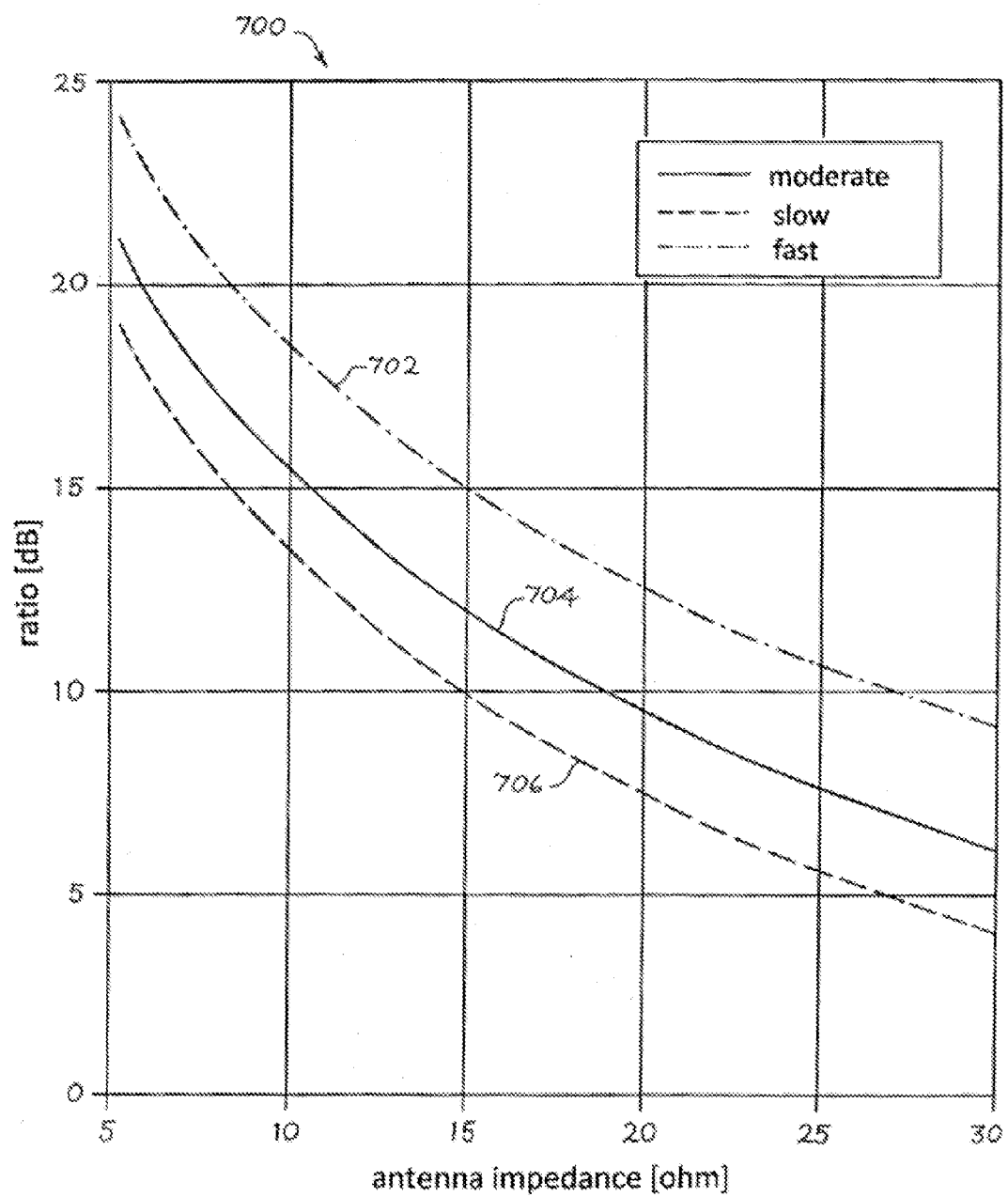
FIG. 7 shows example plot the ratio of minimum modulation to noise created by a switching event.

FIG. 7 shows example plot 700 the ratio of minimum modulation to noise created by a switching event. The minimum system modulation is the minimum change made during symbol modulation. The noise created by a switching event is smaller than the minimum modulation for a range of 25Ω for fast 702, moderate 704, and slow 706 systems. The example system has 351 steps, e.g. 352 fingers. Increasing the number of steps over the range may decrease the noise and/or noise fraction created by a switching event. Other numbers of finger steps may be used.

Figure 8:
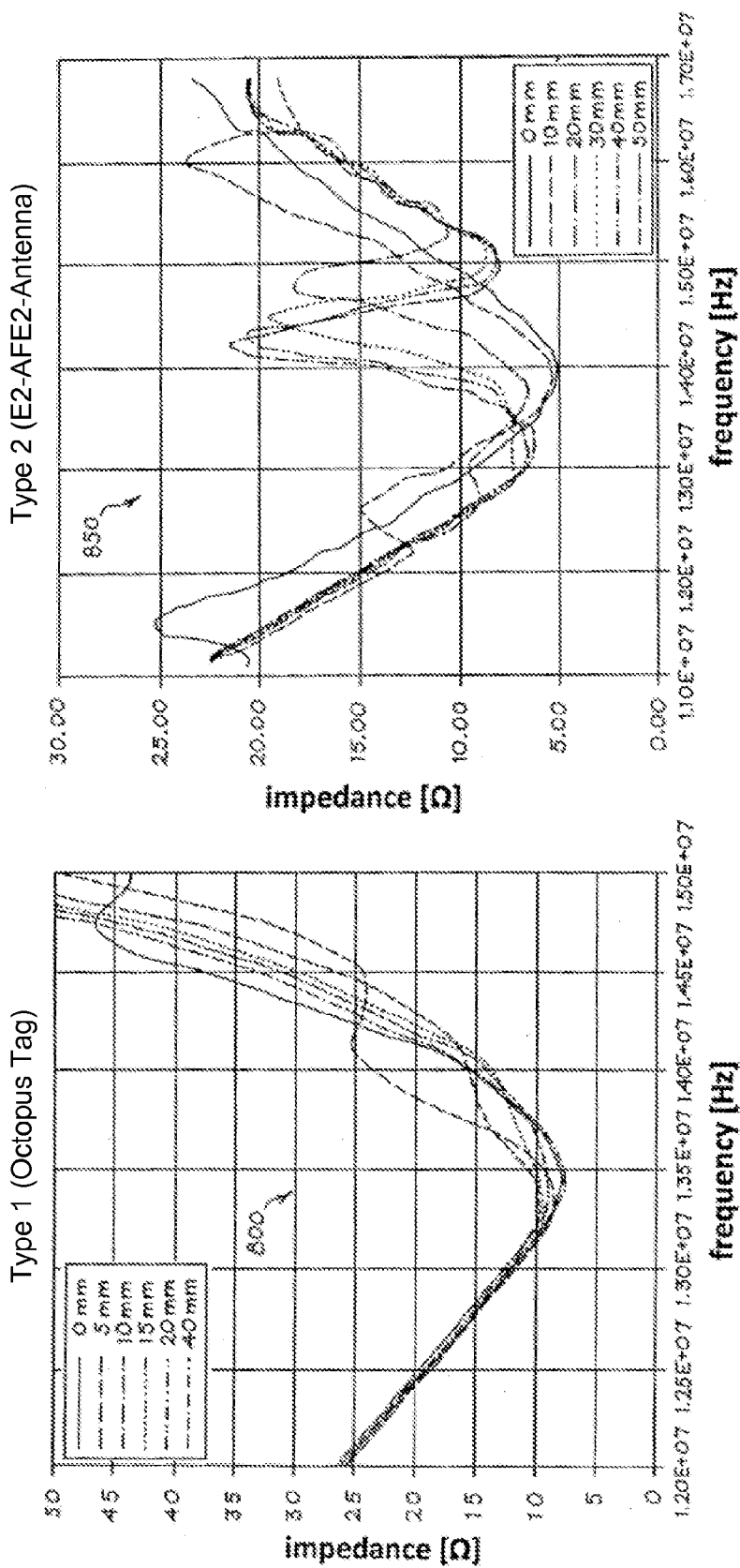
FIG. 8 shows example antenna load variation for reader-tag distance for a first tag type and a second tag type.

FIG. 8 shows example antenna load variation for RTD for a first tag type 800 and a second tag type 850. RTDs ranging from 0 mm to 40 mm are shown for various carrier frequencies. For the first tag type 800 of and a carrier of 13.6 MHz, the antenna load of the reader may range from 8Ω to 12Ω. This is less than two orders of magnitude, which may be compensated for in the systems discussed with respect to FIG. 6. For the second tag type 850 of and a carrier of 13.6 MHz, the antenna load of the reader may range from 5Ω to 20Ω. This is less than two orders of magnitude, which may be compensated for in the systems discussed with respect to FIG. 6. In the examples 800, 850, the maximum variation for RTD for the displayed carrier frequencies is ~17Ω (15Ω to 26Ω) and ~16Ω (6Ω to 22Ω) for the first 800 and second 850 types, respectively. These variations may be compensated for in the systems discussed with respect to FIG. 6. Other tags and load to RTD profiles may be implemented.

The methods, devices, and logic described above may be implemented in many different ways in many different combinations of hardware, software or both hardware and software. For example, all or parts of the system may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. All or part of the logic described above may be implemented as instructions for execution by a processor, controller, or other processing device and may be stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. Thus, a product, such as a computer program product, may include a storage medium and computer readable instructions stored on the medium, which when executed in an endpoint, computer system, or other device, cause the device to perform operations according to any of the description above.

The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above.

Various implementations have been specifically described. However, many other implementations are also possible.

What is claimed is:

1. An apparatus, comprising:
an antenna;
a modulator operatively connected to the antenna, the modulator configured to send a signal to a wireless device via the antenna, the modulator comprising finger elements configured to produce an output impedance;
a controller connected to the antenna, the controller comprising:
   a current detector configured to determine an amplitude of a response received at the antenna from the wireless device, the response comprising a response carrier component; and
   a driver configured to scale, via a switching operation on the finger elements, the output impedance responsive to the amplitude; and
a carrier cancellation path coupled to the modulator, the carrier cancellation path configured to provide a carrier cancellation component to the controller to facilitate removal of the response carrier component from the response.

2. The apparatus of claim 1, where the response carrier component is phase inverted with respect to the carrier cancellation component.

3. The apparatus of claim 1, where the current detector is configured to determine changes to the amplitude at a time scale longer than a modulation rate of the wireless device.

4. The apparatus of claim 3, where the current detector comprises a low pass filter configured to implement the time scale.

5. The apparatus of claim 1, where the amplitude is responsive to a load of the antenna.

6. The apparatus of claim 5, where the driver is configured to maintain the amplitude via scaling the output impedance.

7. The apparatus of claim 1, where the finger elements comprise transistor fingers connected in parallel.

8. The apparatus of claim 7, where the driver is configured to engage an individual one of the transistor fingers in response to a change in the amplitude.

9. The apparatus of claim 1, where:
the modulator comprises two paths; and
the modulator is configured to encode data into the signal via differential phase modulation across the two paths.

10. A device, comprising:
an antenna including a load, the load dependent on a distance between the antenna and a wireless device;
a modulator, operatively connected to the antenna, the modulator configured to send, via the antenna, a signal to the wireless device, the modulator comprising finger elements configured to produce an output impedance; and
a controller coupled to an output of the antenna, the controller comprising:
   a current detector configured to determine a carrier amplitude of a response from the wireless device; and
   a driver configured to scale, via a switching operation on the finger elements, the output impedance responsive to the carrier amplitude to maintain a ratio between the output impedance and the load of the antenna.

11. The device of claim 10, where the load is configured to be modulated at a sub-carrier frequency by the wireless device.

12. The device of claim 10, where the driver is configured to implement a loop algorithm to maintain the ratio within a determined tolerance.

13. The device of claim 10, where the current detector is configured to determine changes to the carrier amplitude at a time scale longer than a modulation period of the wireless device.

14. The device of claim 13, where the current detector comprises a low pass filter configured to implement the time scale by filtering contributions from changes occurring over durations shorter than the time scale.

15. The device of claim 10, where:
the modulator comprises multiple paths; and
the modulator is configured to encode data into the signal via differential phase modulation across the multiple paths.

16. A method comprising:
generating a signal with a modulator, the modulator comprising finger elements configured to produce an output impedance;
transmitting the signal to a wireless device via an antenna coupled to the modulator;
determining an amplitude of a response received at the antenna from the wireless device, the response comprising a response carrier component;
performing a switching operation on the finger elements to scale the output impedance responsive to the amplitude; and
providing, via a carrier cancellation path, a carrier cancellation component to control circuitry for the modulator to facilitate removal of the response carrier component from the response.

17. The method of claim 16, further comprising encoding data into the signal via differential phase modulation across multiple paths of the modulator.

18. The method of claim 16, where determining the amplitude of the response comprises filtering the response at a modulation frequency of the wireless device.

19. The method of claim 16, where performing the switching operation on the finger elements comprises disengaging a finger transistor in the modulator.

20. The method of claim 16, where performing the switching operation on the finger elements comprises engaging a finger transistor in the modulator.

* * * * *